United States Patent [19]

Uyama

[11] Patent Number: 5,819,267
[45] Date of Patent: Oct. 6, 1998

[54] KNOW-HOW MANAGEMENT APPARATUS, AND METHOD

[75] Inventor: Masashi Uyama, Kawasaki, Japan

[73] Assignee: Fujitsu Limited, Kawasaki, Japan

[21] Appl. No.: 626,544

[22] Filed: Apr. 2, 1996

[30] Foreign Application Priority Data

Jun. 30, 1995 [JP] Japan .................................. 7-165418

[51] Int. Cl.⁶ .................................................. G06F 17/30
[52] U.S. Cl. ...................................... 707/6; 707/2; 707/3
[58] Field of Search .................................. 395/603, 610; 707/6, 2, 3

[56] References Cited

U.S. PATENT DOCUMENTS

| | | | |
|---|---|---|---|
| 4,713,775 | 12/1987 | Scott et al. ............................... | 395/50 |
| 4,763,277 | 8/1988 | Ashford et al. ........................... | 395/65 |
| 5,006,983 | 4/1991 | Wayne et al. ............................. | 705/8 |
| 5,204,961 | 4/1993 | Barlow ................................. | 395/187.01 |
| 5,369,763 | 11/1994 | Biles ...................................... | 395/603 |
| 5,592,375 | 1/1997 | Salmon et al. ........................... | 395/207 |
| 5,623,660 | 4/1997 | Josephson ............................... | 395/609 |
| 5,636,344 | 6/1997 | Lewis ................................. | 395/200.54 |
| 5,649,186 | 7/1997 | Ferguson ................................. | 395/610 |

OTHER PUBLICATIONS

MIT faculty, Athena and Academic Computing at MIT: A Guide for Faculty 1995–1996, pp. 1–18., Aug. 31, 1995.
Thomas J. Coppeto, et al., *USENIX, OLC: An On–Line Consulting System for UNIX*, Summer 1989.
Mark S. Ackerman, et al., *ACM COIS '90 Conference on Office Information Systems*, Answer Garden: A Tool for Growing Organizational Memory, 1990, pp. 31–39.
Patent Patent Application Laid–Open No. 4–373072, Dec. 26, 1992.
Martin Roscheisen, et al., *Technical Report CSDTR/DLTR*, A Platform for Third–Party Value–Added Information Providers: Architecture, Protocols, and Usage Examples, 1994, pp. 1–29.
Norihiko Matsuura, et al., *Association of Electronic Information and Telecommunication*, Proposal on Informal Communication Support Interface Realizing Virtual Encounter, D–II, vol. J77–D–II, No. 2, Feb. 1994, pp. 388–396.
Daniel LaLiberte, et al., *WWW'95*, A Protocol for Scalable Group and Public Annotations, 1995.
Will Hill, et al., *CHI '95 Mosaic of Creativity*, Recommending and Evaluating Choices In a Virtual Communicty of Use, May 1995, pp. 194–201.

*Primary Examiner*—Wayne Amsbury
*Attorney, Agent, or Firm*—Staas & Halsey

[57] ABSTRACT

A know-how management apparatus that enters a poster of an article of know-how on an item into a list as a consultant for the item, retrieves a consultant from the list when the item is retrieved, and transmits a question issued from a questioner to the consultant retrieved from the list. In a second aspect of the apparatus, a management right of an article is transferred to another know-how management apparatus. The article is distributively managed by a plurality of know-how management apparatuses. Also in this second aspect, management information, which includes the article whose management right is transferred and information relevant to the article, is transmitted to the know-how management apparatus of the transfer destination. Meanwhile, each of the know-how apparatuses changes manager apparatus information regarding the article whose management right is transferred and which is included in manager apparatus lists in each of the know-how management apparatuses, into manager apparatus information reflecting transfer of the management right to the apparatus of the transfer destination.

8 Claims, 15 Drawing Sheets

FIG. 6

21 → PERSONAL CLIPPING
CONDITION LIST

| ENTERING PERSON'S NAME |
| CLIPPING TARGET NAME |
| CLIPPING INSTRUCTION |
| CLIPPING CONDITION |
| CLIPPING TIME |
| INFORMING DESTINATION OF RESULT |

FIG. 9A
```
KEY WORD RETRIEVAL
 INPUT RETRIEVAL CONDITION
 ┌─────────────────────────────┐
 │SENTENCE STRUCTURE CHECK■│
 └─────────────────────────────┘
```

FIG. 9B
```
SELECTION LIST
 ┌─────────────────────┐
 │1./public/alpha/beta │
 │2./public/alpha/gamma│
 │3./public/beta/beta2 │
 └─────────────────────┘
```

FIG. 9C

◇VIRTUAL PACKAGE◇
PACKAGES
・PACKAGE
    NAME:/public/alpha/beta
・SUMMARY:JAPANESE TEXT EDITOR
・VENDOR: vendor@flab.fujitsu.co.jp
・VERSION:1.00

DOCUMENTS
・COPYRIGHT
・BRIEF INTRODUCTION
・CHANGES FROM LAST VERSION
・OPERATION MANUAL

AVAILABLE SERVICES
・EDITOR ACTIVATION
・SENTENCE STRUCTURE CHECKING FUNCTION

COMMON PEOPLE'S INFORMATION
・VIEWPOINTS
・ARTICLE BROWSING
・CONSULTATION

FIG. 13

```
From:someuser@flab.fujitsu.co.jp
Subject:
Newsgroup:public.alpha.beta
Distribution:world
Consulting:local
Control:consulting
Warranty Rating:1

/public/alpha/beta
IS EDITOR FOR JAPANESE WITH SENTENCE
STRUCTURE CHECKING FUNCTION QUITE USEFUL FOR USER OF
/public/alpha/editor

BUT UNUSEFUL AT LOW-SPEED MACHINE
```

FIG. 14

```
From:someuser@flab.fujitsu.co.jp
Subject:SENTENCE STRUCTURE
        CHECKING FUNCTION
Newsgroup:public.alpha.beta
Distribution:world
View:/public/alpha/beta/
     public/alpha/gamma/
     public/beta/beta2
Control:management get MANAGEMENT OF KNOW-HOW RELATED TO TEXT
EDITOR HAVING SENTENCE STRUCTURE CHECKING
FUNCTION MAY BE UNDERTAKEN
```

KNOW-HOW MANAGEMENT APPARATUS, AND METHOD

BACKGROUND OF THE INVENTION

1. Field of the Invention

The present invention relates to a know-how management apparatus for managing articles regarding items which are entered in a data base, a clipping apparatus for clipping items which satisfy a retrieval condition from the data base, a know-how management system where a plurality of know-how management apparatuses are connected, and an interface apparatus for extracting know-how from either one of the know-how management apparatuses which are included in the know-how management system.

2. Description of the Related Art

There are data bases for "sightseeing guide," "product information," etc. A user retrieves a corresponding item from a "sightseeing guide" data base, using "accommodations in City of xxx" as a key word when planning a trip. In another case, if a user wants to proofread a text more easily, he retrieves a corresponding item from a "product information" data base, using "a software product having a sentence structure check function" as a key word. When a plurality of accommodations or a plurality of software products is retrieved, the user verifies the contents of the respective items in light of his purposes and evaluates which one of the retrieved results is suitable.

Know-how, such as other people's opinions or usage of facilities, products and the like, is an important factor for judgement of the usefulness of retrieved information. However, items accumulated in a data base, i.e., information regarding accommodations (e.g., a room charge, a location convenience), information regarding software (e.g., an operation manual, available service), etc., is information which is generally provided from suppliers of facilities, products and the like. Hence, in general, such information does not include practical know-how, which is provided regardless of whether the information is advantageous or disadvantageous for the suppliers of the facilities, products and the like.

In addition, when a user buys difficult software or the like from a manufacturer which offers a service of answering questions from users only within limited business hours, the following factor is also important for the users who have questions. That is, the user may have friends who can act as consultants and who can answer at any time a question regarding how to use the software, in addition to such limited customer service that is not always accessible to the user.

For these reasons, in addition to a database management apparatus, provision of a more convenient retrieving system to users requires an apparatus which can be called "a know-how management apparatus". Such an apparatus has a function of managing know-how regarding each item and a function of transmitting a question to a voluntary consultant and receiving an answer from the consultant.

FIG. 1 and FIG. 2 are functional block diagrams showing a structure of a conventional information retrieving system which comprises such a know-how management apparatus described above. In FIG. 1 and FIG. 2, denoted by 1' is a database management apparatus for managing a data base 11 in which items with key words such as "accommodations" and "software products" are accumulated. A clipping apparatus 2', an item-article list 31, a know-how management apparatus 3', and an interface apparatus 4' are connected to the database management apparatus 1' through a network 5. The clipping apparatus 2' automatically clips items from the data base 11, in accordance with retrieval conditions such as an item name which is preliminarily set by a user and a precious retrieval date. The item-article list 31 stores articles of know-how by items stored in the data base 11.

The know-how management apparatus 3' manages an item-consultant list 39 in which consultants by items such as specialists on the items who can answer a question on the item. Through the interface apparatus 4', a user demands entry of the database management apparatus 1', referring or retrieval of items to or from the data base 11. The user also sets and updates a retrieval condition of the clipping apparatus 2' and writes a question regarding an item. The a question is transmitted from the know-how management apparatus 3' to a consultant, and the user browses an article which is managed by the know-how management apparatus 3' or an answer from a consultant.

In addition to the data base 11, the database management apparatus 1' comprises referring/updating means 12 which enters an item into the data base 11 or reads an item from the data base 11 for referring responsive to a demand for entry or referring which is supplied to the data base 11 from another apparatus through the network 5. Apparatus 1' also comprises retrieving means 13 for retrieving a list of items which satisfy a retrieval condition, which is supplied from another apparatus through the network 5, from the data base 11.

The know-how management apparatus 3' is a generally used electric bulletin board with expanded functions so that users of a computer system exchange opinions, know-how, questions, etc. The know-how management apparatus 3' comprises an item-article list 31, article referring/posting means 32, article distributing means 302, an item-distribution destination list 301, a timer 36, and article managing means 35. In the item-article list 31, know-how which is written through the interface apparatus 4', i.e., posted articles (which correspond to the Newsgroup for the standard document RFC (Request For Comments) 1036 on the Internet) are sorted and stored by items. The article referring/posting means 32 enters a posted article in the item-article list 31, or reads an article from the item-article list 31 for referring. The article distributing means 302 distributes articles to other know-how management apparatuses. Distribution destination of articles which are managed by items are described in the item-distribution destination list 301. The article managing means 35 changes management information 300 (i.e., a general term of the item-article list 31 and item-distribution destination list 301), based on a time which is set in the timer 36 or a posted control article (an article in which a control statement for controlling management is described in a header).

Further, the know-how management apparatus 3' comprises article retrieving means 38 for retrieving an article from the item-article list 31, the item-consultant list 39 the names of consultants in charge of the respective items are entered, question transmitting means 310 for receiving a question from a user, for transmitting the question to consultants who are entered in the item-consultant list 39 and for transmitting an answer from a consultant to a questioner, and a question processing state list 311 in which a processing state regarding each question is stored. The question transmitting means 310 enters a question to which a consultant could not provide an answer into the item-article list 31 through the article referring/posting means 32 so that other readers can read the question. The question transmitting means 310 successively stores a processing state regarding each question in the question processing state list 311.

Since know-how changes with time, know-how accumulated in the item-article list 31 of the know-how management apparatus 3' does not always include the exact solution which a user wishes to obtain. Therefore, another means for providing information becomes necessary when accumulated know-how fails to provide an appropriate solution, that is, a function of entering consultants and of questioning and answering questions. The "Answer Garden" proposed by Ackerman et al., of MIT may be used as such a system.

See "Answer Garden: A Tool for Growing Organizational Memory," Mark S. Ackerman and Thomas W. Malone, in Proceedings of ACM COIS '90 Conference on Office Information Systems, pp. 31–39, 1990.

Consultants with expert knowledge on each item are entered in the "Answer Garden." If a user fails to retrieve desired know-how, he presses a button which reads "I'm unhappy" on an interface apparatus and issues a question mail to an entered consultant who has expert knowledge. A reply from the consultant on the question is automatically added to the list of know-how articles.

Entry of consultants as described above also serves for filtering of an FAQ (Frequently Asked Question) from a question from a general reader. In "OLC (On-Line Consulting System)" established by Project Athena of MIT, a user can directly and interactively question a consultant who is entered in an item-consultant list 29 without using the article retrieving means 38. (See "OLC: An On-Line Colsulting System for UNIX," Thomas J. Coppeto, Beth L. Anderson, and Daniel E. Geer Jr., USENIX-Summer '89, pp. 83–94, 1989.) If a question is an FAQ which is likely to be stored in the item-article list 31, the consultant retrieves the answer which is stored in the item-article list 31 using the article retrieving means 38, thereby saving the labor of writing the answer. "OLC" also allows a consultant to transmit a difficult question he cannot answer, under his responsibility, to another consultant who has a deeper knowledge, or to post the question to the electric bulletin board so that the question will be discussed.

The interface apparatus 4' comprises item entering means 44 for entering items into the data base 11, item selecting means 41 for selecting an item to be retrieved from the data base 11, article browsing means 400 for displaying articles on a screen so that users can read the articles in the know-how management apparatus 3', and questioning/answering means 43 for issuing a question to the question transmitting means 310 and for answering a question which is transmitted from the question transmitting means 310.

For example, in the WWW (World Wide Web), a system for providing information on a network (See "World-Wide Web: The Information Universe," T. J. Berners-Lee et al., Electronic Networking: Research, Applications and Policy, Vol. 2; No. 1, pp. 52–58, 1992), by creating in the HTML (Hyper Text Mark-up Language), a new document which includes a plurality of URL (Uniform Resource Locator) identifiers, with each designating an access point to a document or to a service different services on networks linked with each other are offered to a user. That is, using the URLS and HTML, it is possible to link pointers of the retrieving means 13 of the database management apparatus 1' and the article referring/posting means 32 of the know-how management apparatus 3'. Hence, services offered by both apparatuses linked with each other are presented.

In addition, as a system for linking retrieval results on a data base with a list of users who accessed the same item in the past, the "Electric Museum," by Matsuura of Keio University, is available. (See "Proposal on Informal Communication Support Interface Realizing Virtual Encounter," Norihiko Matsuura et al., Association of Electronic Information and Telecommunication, D-II, Vol. J77-D-II, No. 2, pp. 388–396, February 1994.)

The "Electric Museum" allows referred to a list of users who accessed the same item (picture).

The clipping apparatus 2' comprises personal clipping condition list 21, clipping condition updating means 22, a personal clipping agent 223, and a timer 24. The personal clipping condition list 21 stores a personal clipping condition which includes, at least, the name of an entering person, the name of a target apparatus, a clipping request command, a clipping condition, a clipping time, and a result informing destination. The clipping condition updating means 22 updates the personal clipping condition, which is stored in the personal clipping condition list 21, in accordance with a clipping condition entering/updating request from a user. The personal clipping agent 223 performs clipping from the data base 11 for a user, in accordance with a personal clipping condition. The name of a target apparatus included in the personal clipping condition designates the database management apparatus 1'.

When a set time for the timer 24 reaches a clipping time which is stored in the personal clipping condition list 21, the personal clipping agent 223 issues a clipping request command together with a clipping condition to the database management apparatus 1' which is designated by the name of a target apparatus, and sends a list of items resulted from clipping to an apparatus which is designated by the result informing destination which is stored in the personal clipping condition list 21.

As described above, the conventional system, which corresponds to the know-how management apparatus 3' such as the "Answer Garden," and "OLC", only enters special consultants in advance. However, posters of articles providing opinions and know-how, such as people who already have used facilities, products, etc., are not automatically entered in such a conventional system. In general, a poster of an article of opinion or know-how tends to avoid responsibility. For instance, when a manager of a computer system as a whole for a certain department of a certain company, posts an article which introduces software newly installed on computers, he is likely to post the article to a newsgroup of his department which provides the minimum range of responsibility for him regarding the article. Hence, an inconvenience in the situations of the poster of the article as described above being not entered as a consultant is that other departments of this company, which are discussing introduction of similar software, cannot refer to his article.

On the other hand, a person bears responsibility of some kind to members of other departments which are outside his responsibility, since he discloses his opinion and know-how to them, if he posts an article to a newsgroup of a large scale which is limited by a topic. For example, the person may post the article to a newsgroup defined by [company/software/word processor], consisting of readers from all over a company, in order to distribute the article of an opinion and know-how to a larger range of readers.

Thus, while it is necessary to designate a distribution range, to distribute the article itself, separately from a consulting range to which a poster bears responsibility regarding the contents of the article, no means for attaining this has been provided.

Further, the conventional clipping apparatus 2' cannot designate the know-how management apparatus 3' as the name of a retrieval target apparatus in a personal retrieval condition. Because of this, it is not possible to retrieve anl item such as "item for which more than ten articles are posted (i.e., popular item)" and "item oil which Mr. So-and-so has posted an article (i.e., reliable item)" from the data base 11, based on the number of know-how and the names of posters which are accumulated in the know-how management apparatus 3', that is, based on reputation information of users.

In addition, know-how accumulated in the item-article list 31 of the know-how management apparatus 3' increases. Since the efficiency of retrieving considerably deteriorates if the number of the know-how becomes too large, rearrangement of some kind must be performed at a proper time. For instance, rearrangement is to sort out FAQs, which are probable to be redundantly accumulated, into pairs of abstract questions and answers, by rephrasing rhetorical expressions which are included in the original questions. In this case, there is another advantage created in that rearrangement makes it easier for users to use the system.

However, in order to rearrange articles, expert knowledge on the item is necessary. Hence, a know-how management system should allow its administrator to transfer the right of managing and rearranging articles, together with the management information 300 which includes articles to other persons, and to distributively manage the same with a plurality of know-how management apparatuses when a new item on which a manager of the know-how management apparatus does not have expertise is added, or when the scale of the item-article list 31 becomes too large to exceed the managing capacity.

The article distributing means 302 of the conventional know-how management apparatus 3' distributes the management information 300 to other know-how management apparatuses 3' so that almost the same quantity of articles are stored in the know-how management apparatuses 3'. However, the article distributing means 302 does not have a function of selectively transferring the managing right of the management information 300 regarding only an item which is outside the expertise of the manager to other know-how management apparatus. When articles are distributed to other know-how management apparatuses, so that the quantity of management becomes equal between the apparatuses, whereby management of articles on the same item is distributed among a plurality of know-how management apparatuses, a user must access the plurality of know-how management apparatuses to retrieve an article regarding one item. As a result, the user cannot retrieve an article and a consultant quickly, and if the contents of the management information, such as consultants, are to be updated, the manager must update consultants for all articles which are distributively managed among the plurality of know-how management apparatuses. However, if the manager forgets to update the information, the contents of the management information inconveniently remain old. Therefore, the manager of the know-how management apparatuses must always grasp the manager apparatuses of articles for which the managing rights have been transferred due to distribution of management, which increases the responsibility of the manager.

To reduce the responsibility of the manager, it is necessary to ensure a function of automatically judging which know how management apparatus manages articles which are distributively managed among the plurality of know-how management apparatuses. Further, where articles are distributively managed among a plurality of know-how management apparatuses, it is necessary, to ensure a function of transmitting management information in response to a management right, to get a request and a management right transfer request from other know-how management apparatuses.

The problems above can be summarized as follows. It is difficult for a person retrieving an item in a data base to obtain an advice from a precedent user, on the retrieved item. It is impossible to clearly designate a range of distributing information to which a poster of an article should be responsible as a consultant. It is impossible to select an item from a data base, based on reputation among users which is accumulated in a know-how management apparatus. A manager of articles on opinions of users and know-how bears a great responsibility.

SUMMARY OF THE INVENTION

The present invention has been made to solve the problems as described above.

A know-how management apparatus according to the present invention is characterized in that it enters a poster of an article which is related to an item into a consultant list, as a consultant on this item, that it retrieves a consultant entered in the consultant list from the list when an item is retrieved, and that it transmits a question which is issued from a questioner to a consultant who is retrieved from the consultant list.

A know-how management apparatus according to the present invention is characterized in that when a poster of an article is entered in a consultant list as a consultant, it sets distribution range information which limits a range for distributing information to which the poster of the article should be responsible regarding the contents of his advice as a consultant on the item, in the consultant list, and in that when consultants regarding an item from the consultant list, it retrieves from the consultant list only a consultant whose responsible distribution range includes the distribution range to which a questioner belongs, as a consultant on the item.

Know-how management apparatus and system according to the present invention are characterized in that management information which consists of articles whose management right is to be transferred and information related to the articles, is transmitted to the second know-how management apparatus when a management right on articles which are distributively managed among a plurality of know-how management apparatuses is transferred from a first know-how management apparatus to a second know-how management apparatus, and the second know-how management apparatus receives the management information which is transferred from the first know-how management apparatus, and characterized in that as the management information is transferred, manager apparatus mapping means of a right transferring know-how management apparatus, for example, changes manager apparatus information which is related to articles with the management right transferred in manager apparatus lists of all know-how management apparatuses within the system which includes the transferring and transferred know-how management apparatuses, into manager apparatus information which designates the right transferred know-how management apparatus.

An interface apparatus according to the present invention is characterized in that when retrieval of an article related to an item to be retrieved from a data base is requested to any one of a plurality of know-how management apparatuses which are included in a know-how management system of distributively managing articles related to items entered in the data base, the interface apparatus inquires a cache about the manager apparatus of the item, and when the item is not stored in the cache, the interface apparatus inquires any one of the know-how management apparatuses about the manager apparatus of the item.

A clipping apparatus according to the present invention is characterized in that it performs clipping through a know how management apparatus in accordance with a clipping condition on reputation, such as that the number of articles is equal to or larger than a predetermined number or that Mr. So-and-so has posted all article, in addition to performing clipping from a database management apparatus based on a retrieval condition of an item name.

A clipping apparatus according the present invention is characterized in that it executes clipping at a time which is set in a timer.

Hence, the present invention aims to provide a know-how management apparatus which makes it easy for a person who retrieves from a data base to look a precedent user for an advice regarding an item which is retrieved.

Further, the present invention aims to provide a know-how management apparatus in which a poster of an article is responsible as a consultant only within a limited range for distributing information.

Further, the present invention aims to provide a know-how management apparatus and a know-how management system in which transfer of a management right of articles among a plurality of know-how management apparatuses is easy, and in which it is easy to judge the location of an article which is transmitted as the management right is transferred so that a burden on a manager is little.

Further, the present invention aims to provide an interface apparatus for extracting an article to retrieve, at a high speed, from either one of the know-how management apparatuses within a know-how management system which distributively manages articles.

Further, the present invention aims to provide a clipping apparatus for clipping an item and/or an article from a data base and/or a know-how management apparatus, based on whether reputation among users and information from reliable consultants are available.

The above and further objects and features of the invention will more fully be apparent from the following detailed description with accompanying drawings.

BRIEF DESCRIPTION OF THE DRAWINGS

FIG. 6 is a conceptual view of a personal retrieval condition list for the clipping apparatus according to the present invention;

FIGS. 9A–9C are views showing an example of a retrieval screen according to the present invention;

FIG. 13 is a view showing an example of a control article for entering a consultant according to the present invention; and FIG. 14 is a view showing an example of a control article for obtaining a management right according to the present invention.

DESCRIPTION OF THE PREFERRED EMBODIMENTS

Figure 1:
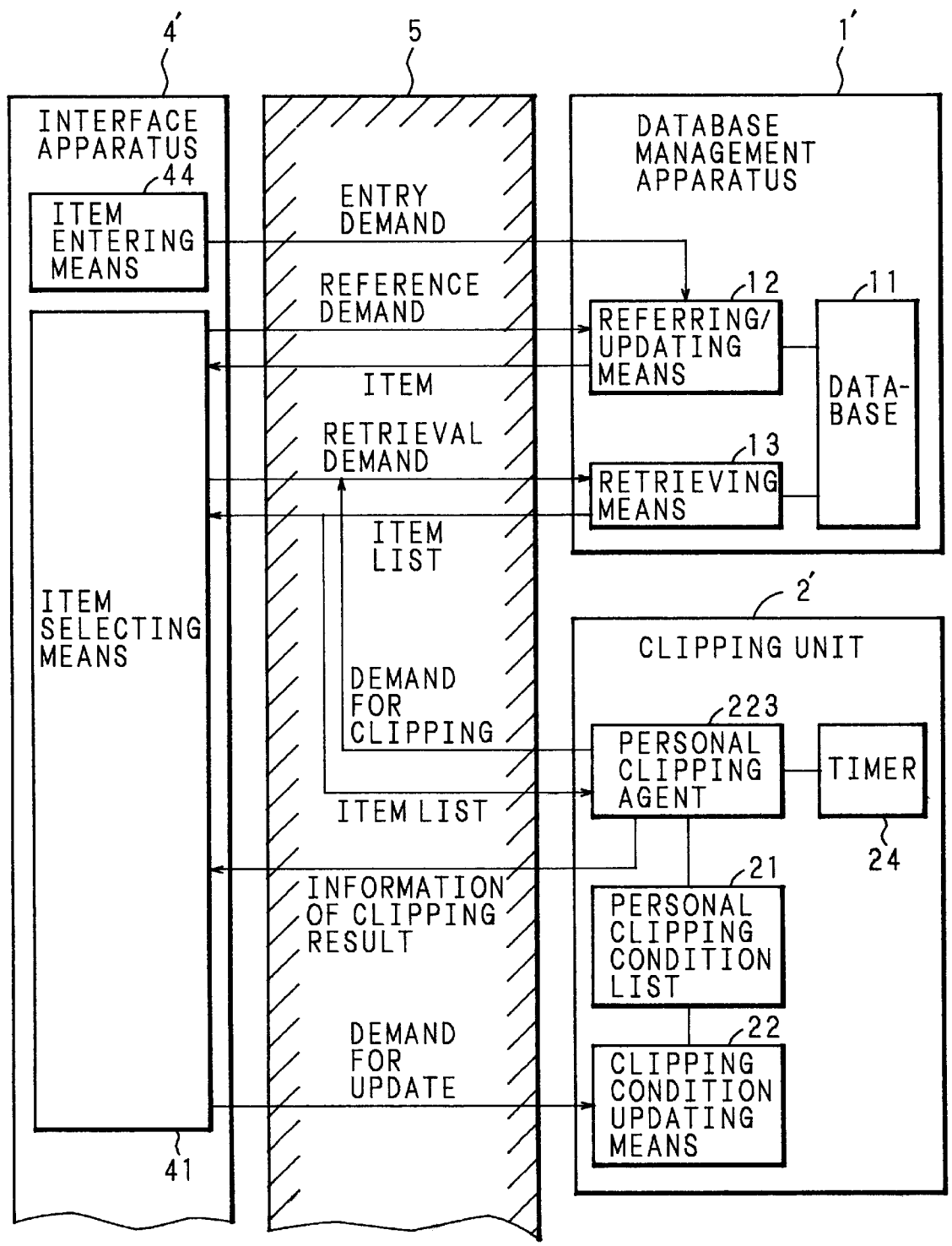
FIGS. 1 and 2 are block diagrams of a conventional information retrieving system.
Figure 2:
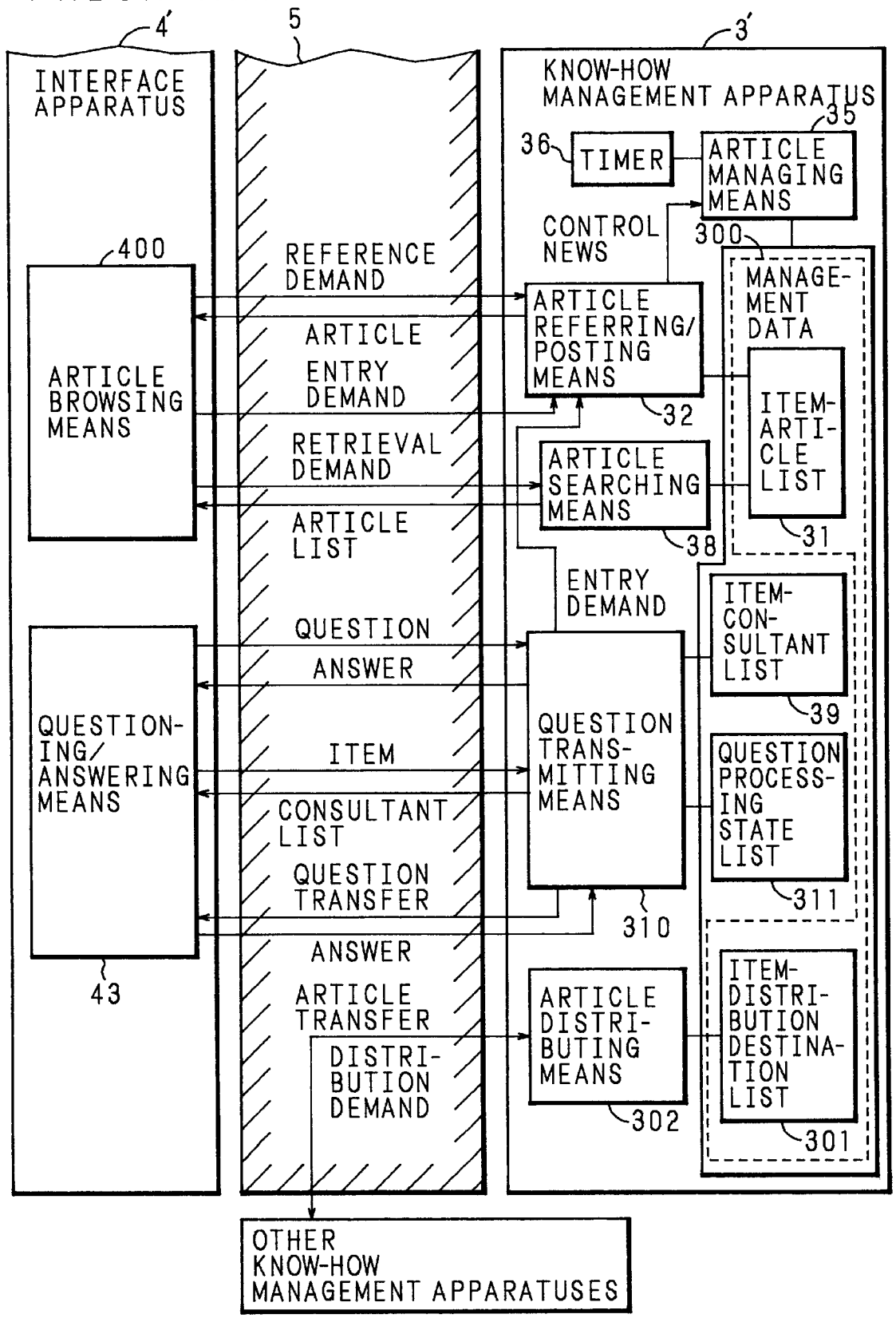
Figure 3:
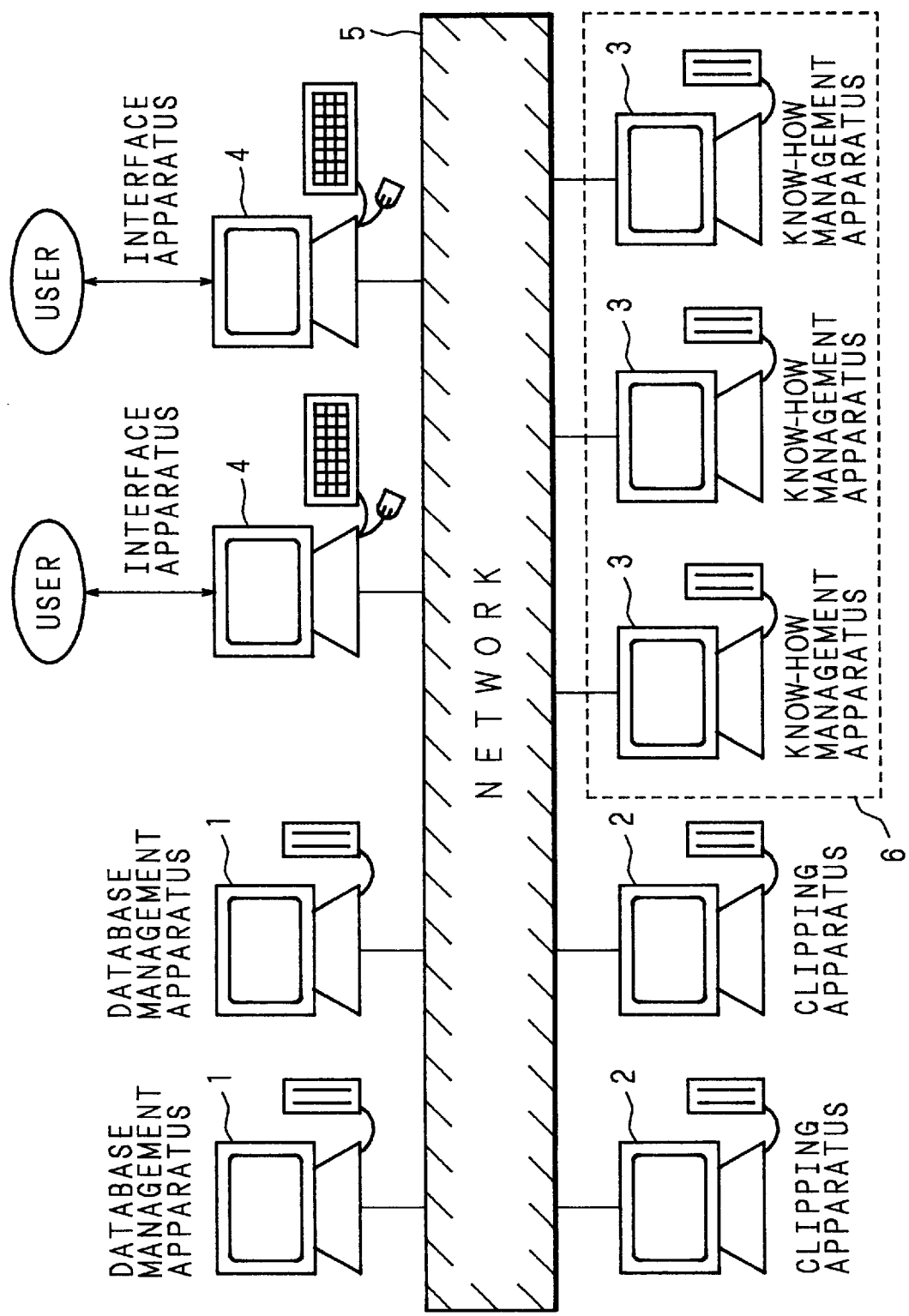
FIG. 3 is a view showing an example of apparatuses according to the present invention as they are connected.

FIG. 3 is a view showing a system where clipping apparatuses 2, know-how management apparatuses 3, and interface apparatuses 4 as they are connected to database management apparatuses 1 through a network 5. In a preferred embodiment of the present invention, the plurality of the know-how management apparatuses 3 are connected to each other through the network 5, thereby forming a know-how management system 6.

Each of the database managemement apparatuses 1, the clipping apparatuses 2, and the know-how management apparatuses 3 formed by a computer installing a program which controls an operation of each apparatus, and an external memory device for accumulating data, for example. The interface apparatus 4 includes a computer installing a program which controls an access to another apparatus, and a data input device such as a key board and a mouse.

Figure 4:
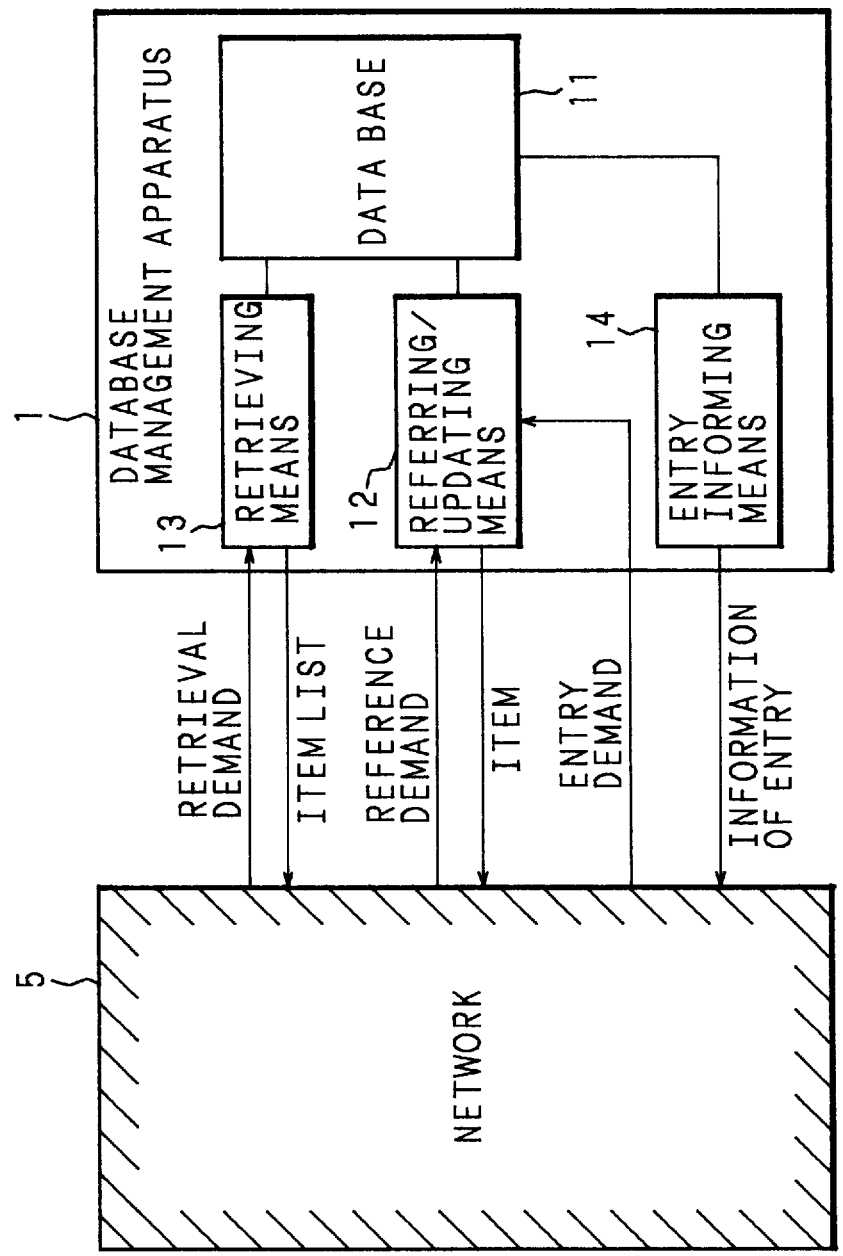
FIG. 4 is a block diagram of a database management apparatus.
Figure 5:
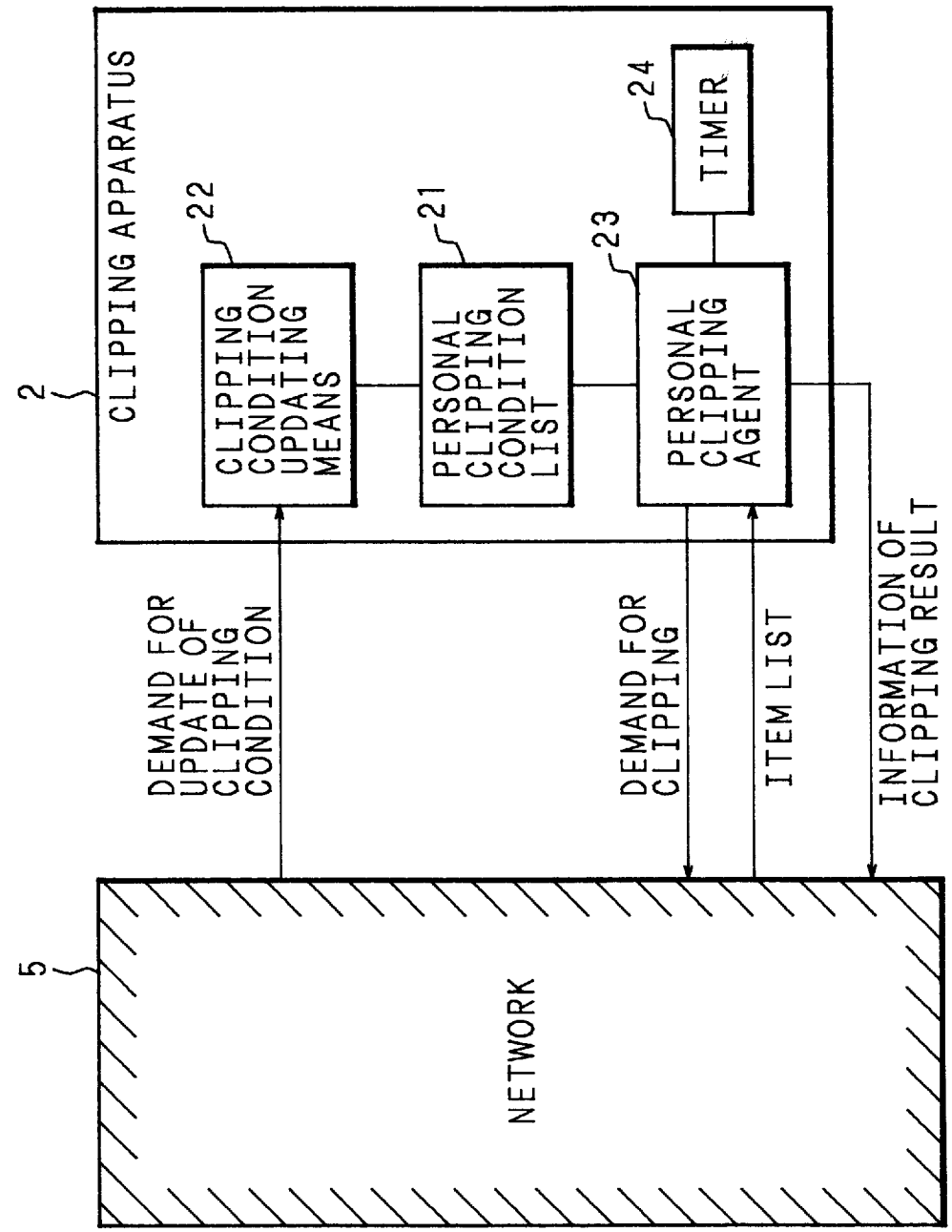
FIG. 5 is a block diagram of a clipping apparatus according to the present invention.
Figure 7A:
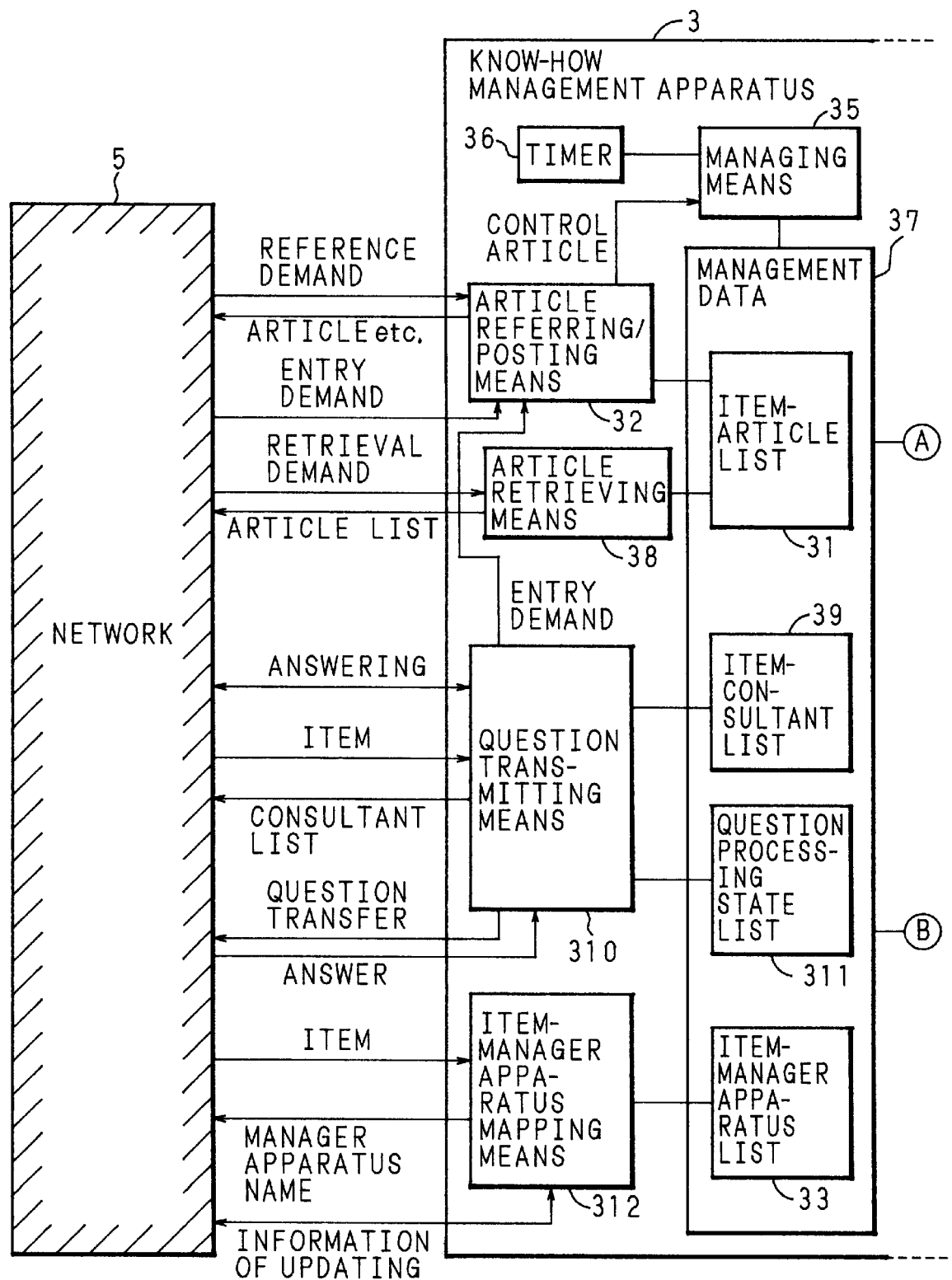
FIGS. 7A and 7B are block diagrams of a know-how management apparatus according to the present invention.
Figure 7B:
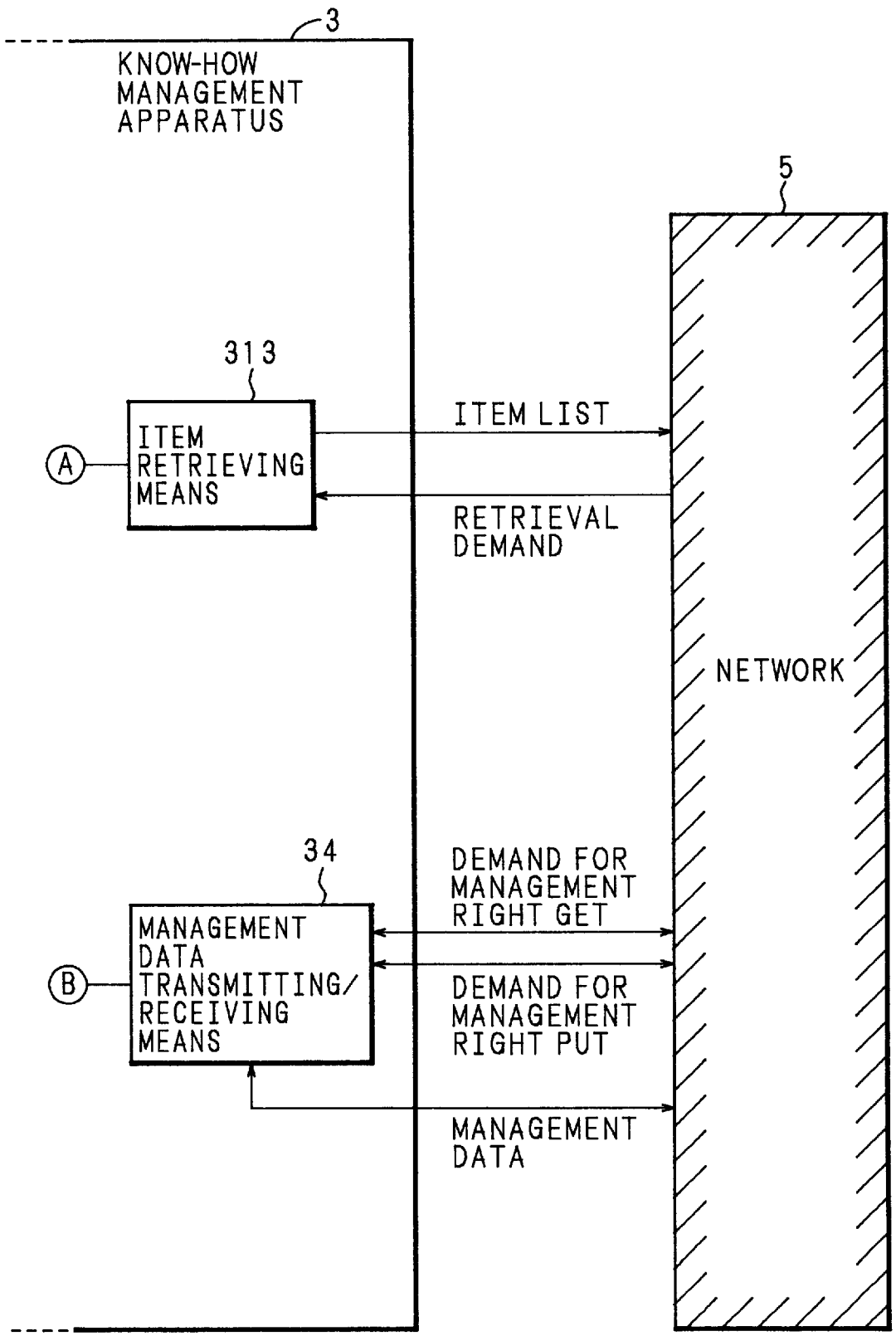
Figure 8:
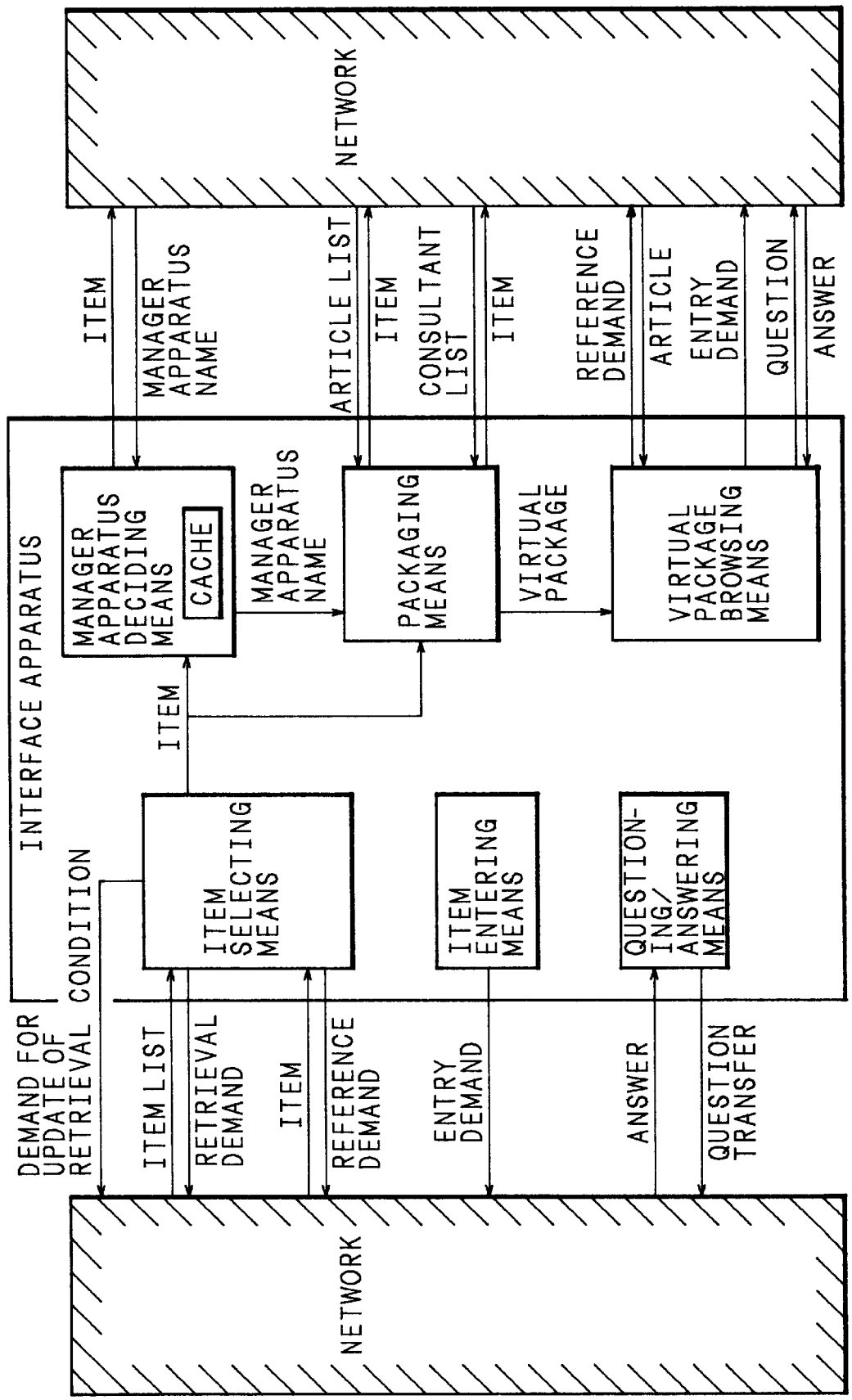
FIG. 8 is a block diagram of an interface apparatus according to the present invention.

FIG. 4 is a block diagram of a database management apparatus 1, FIG. 5 is a block diagram of a clipping apparatus 2 of the invention, FIG. 6 is a conceptual view of a personal retrieval condition list 21 of a clipping apparatus 2 according to tire present invention, FIGS. 7A and 7B are block diagrams of a know-how management apparatus 3 according to the present invention, and FIG. 8 is a block diagram of an interface apparatus 4 according to the present invention.

The database management apparatus 1 of FIG. 4 comprises a data base 11 accumulating items such as "sightseeing guide" and "software product information," and the following means. Referring/updating means 12 enters an item into the data base 11 on receiving art entry request and a referring request on an item which is given to the data base 11 from other apparatuses through the network 5, and refers to an item in the data base 11. Retrieving means 13 retrieves a list of items from the data base 11, which satisfy a retrieval condition supplied from other apparatuses through the network 5. Entry informing means 14 transmits new entry of and changes in items to the know-how management apparatuses 3.

The clipping apparatus 2 of FIG. 5 according to the present invention comprises the personal clipping condition list 21, clipping condition updating means 22, a personal clipping agent 23 and a timer 24. The personal clipping condition list 21 stores a personal clipping condition which includes, at least, the name of an entering person, the name of a clipping target apparatus, a clipping instruction, a clipping condition, a clipping time, a result informing destination (See FIG. 6). The clipping condition updating means 22 updates the personal clipping condition which is stored in the personal clipping condition list 21, in accordance with a clipping condition entering/updating demand from a user. The personal clipping agent 23 clips items and/or articles from the data base 11 and/or the know-how management apparatus 3, in accordance with a personal clipping condition. As the name of a clipping target apparatus, the know-how management apparatuses 3 and/or the database management apparatuses 1 may be designated.

The personal clipping agent 23 issues a clipping demand to the know-how management apparatus 3 and/or the database management apparatus 1, when a time which is set in the timer 24 reaches a clipping time which is included in the personal clipping condition.

The plurality of the know-how management apparatuses 3 of FIGS. 7A and 7B are connected to each other through the network 5, thereby forming a know-how management system 6 and distributively managing articles. Each know-how management apparatus 3 includes the following elements: an item-article list 31 for rearranging and storing articles by items; article referring/posting means 32 for entering articles which are posted through the interface apparatus 4 into the item-article list 31 or for referring an article in the item-article list 31; article retrieving means 38 for retrieving an article from the item-article list 31; an item-consultant list 39 storing the names of consultants on the respective items according to items; question transmitting means 310 for receiving a question from a user, transmitting the question to a consultant who is entered in the item-consultant list 39, and for transmitting an answer from a consultant to a questioner; a question processing state list 311 storing a processing state on each question; a timer 36; and article managing means 35 for changing management information 37 (i.e., general terms of the above-described item-article list 31, the above-described item-consultant list 39, the above-described question processing state list 311, and an item-manager apparatus list 33 which win be described later) based on a time which is set in the timer 36 or a posted control article (i.e., an article in which a control statement to control management of the article is described in a header).

The question transmitting means 310 enters a question on which a consultant could not answer into the item-article list 31 through the article referring/posting means 32, so that other readers can read it. The question transmitting means 310 also stores processing states on questions, one by one, in the question processing state list 311.

Each know-how management apparatus 3 further includes the following elements: management information transmitting/receiving means 34 for removing information related to a requested item from the management information 37 and transmitting the same to a requesting know-how management apparatus 3 in accordance with a management right get request from the requesting know-how management apparatus 3, or for receiving information related to a requested item and adding the same to the management information 37 in accordance with a management right transfer request from another know-how management apparatus 3; the item-manager apparatus list 33 showing which know-how management apparatus 3 manages which item; and item-manager apparatus mapping means 312 for checking the item-manager apparatus list 33 and returning the name of a corresponding manager apparatus to an inquirer in response to an inquiry on the manager apparatus of an item, and for issuing a notice of entry to other know-how management apparatuses 3 when the item-manager apparatus list 33 is changed due to transmission of information associated with transfer and obtaining of a management right.

The interface apparatus 4 of FIG. 8 according to the present invention includes item entering means 14 for entering items into the data base 11, item selecting means 41 for issuing a retrieval request and a referring request to the database management apparatuses 1 and for issuing an updating request for updating a retrieval condition to the clipping apparatus 2, and questioning/answering means 43 which serves as means for issuing a question to the question transmitting means 310 of the know-how management apparatus 3 and means for answering a question which is transmitted from the question transmitting means 310.

The questioning/answering means 43 is used by consultants who are entered in the item-consultant list 39 of the know-how management apparatus 3. Consultants browse a question which is transmitted from the question transmitting means 310, using the questioning/answering means 43, and provide for an answer.

The interface apparatus 4 further includes the following elements: manager apparatus deciding means 45 for checking a cache 46 during retrieving of an item, and thereafter for inquiring the item-manager apparatus mapping means 312 of an arbitrary one of the know-how management apparatuses 3 about manager apparatus of the item if a corresponding item does not exist within the cache 46 which is included in the manager apparatus deciding means 45; packaging means 47 for asking the know-how management apparatuses 3 obtained by the manager apparatus deciding means 45 for retrieval of an article list and a consultant list which are related to the item obtained by the item selecting means 41, and for generating a virtual package linking the item, the article list and the consultant list; and virtual package browsing means 42 for disclosing the virtual package which is generated by packaging means 47 so that a user can refer to the item, the article list and the consultant list which are related to the item. The virtual package browsing means 42 provides for an interface through which a user makes a question about an item and an interface through which a user posts a new article.

Next, a specific description will be given on an operation of an information retrieval system in which the clipping apparatuses 2, the know-how management apparatuses 3, and the interface apparatuses 4 are connected to the database management apparatuses 1 on the network 5, with reference to FIGS. 9 to 14. In the present embodiment, the database management apparatuses 1 manages a group of software products.

1) Entry of Item

A user can add a new item into the data base 11, using the item entering means 44 of the interface apparatus 4. The entry informing means 14 of the database management apparatus 1 issues an entry notice to an arbitrary know-how management apparatus 3, upon addition of an item.

An entry notice is realized by a control article. In the know-how management apparatus 3 which received an entry notice through the article referring/posting means 32, the article managing means 35 interprets the control article and generates an article list regarding the item within the item-article list 31 and a consultant list regarding the item within the item-consultant list 39, so as to change the contents or add new contents to the item-manager apparatus list 33. The item-manager apparatus mapping means 312 informs the other know-how management apparatus 3 of the change in the item-manager apparatus list 33. As a result, whichever know-how management apparatus 3 a user refers to, he can find the manager apparatus of the item and refer to the article list and the consultant list which are related to the item.

2) Generation of Virtual Package

When a user issues a retrieval request to the database management apparatus 1, using the item selecting means 41 of the interface apparatus 4, in response to the retrieval request, the retrieving means 13 of the database management apparatus 1 retrieves the data base 1 and returns a list of items which satisfy a retrieval condition. The item selecting means 41 discloses the list of the items to the user and urges the user to select. When the user selects one of the items, the item selecting means 41 issues a referring request to the database management apparatus 1. In response to the referring request, the referring/updating means 12 of the database management apparatus 1 extracts the item from the data base 11 and returns the item to the item selecting means 41.

The item selecting means 41 asks the managers apparatus deciding means 45 of the interface apparatus 4 to identify the manager apparatus within the know-how management apparatus 3 which includes information regarding the item. The manager apparatus deciding means 45 checks the internal cache 46, first. If a corresponding item exists within the cache 46, the manager apparatus is identified by the cache 46. Conversely, if the corresponding item does not exist within the cache 46, the manager apparatus deciding means 45 inquires the item-manager apparatus mapping means 312 of an arbitrary know-how management apparatus 3 about the manager apparatus of the item. The packaging means 47 of the interface apparatus 4 asks the know-how management apparatus 3 which is identified as the manager apparatus for taking a look at an article list and a consultant list which are related to the item. In response to the inquiry, the article referring/posting means 32 of the know-how management apparatus 3 extracts the article list related to the item from the item-article list 31 and returns the list to the packaging means 47. Meanwhile, in response to the inquiry, the question transmitting means 310 of the know-how management apparatus 3 extracts the consultant list related to the item from the item consultant list 39 and returns the list to the packaging means 47.

The packaging means 47 generates a virtual package linking the article list and the consultant list which are related to the item and the item itself, and supplies the package to the virtual package browsing means 42. The virtual package browsing means 42 discloses the virtual package to users. Users can refer to the item, the list of related articles of the past and the list of consultants on the item, through the virtual package.

Figure 10:
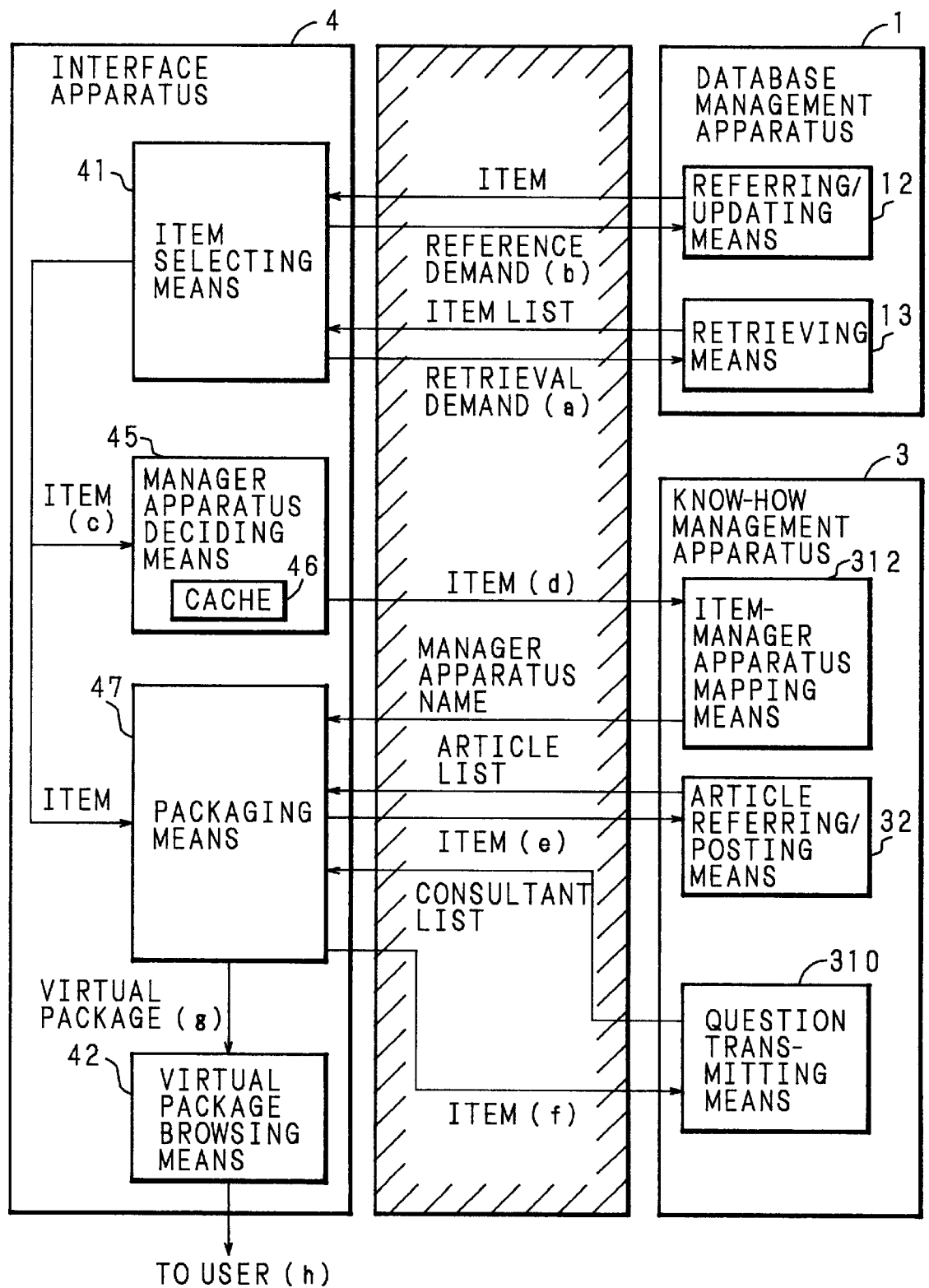
FIG. 10 is an explanatory view showing operations of the know-how management apparatus and the interface apparatus according to the present invention.

FIGS. 9A–9C show screens on which a user retrieves. FIG. 10 shows an operation of the system during a user obtaining a virtual package through the interface apparatus 4. For simplicity of illustration, an inner structure which is not necessary for describing the operation is omitted in FIG. 10.

In this embodiment, a user retrieves a list of software products, through a key word retrieval. In the screen shown in FIG. 9A, a user retrieves using a key word, "sentence structure check." The item selecting means 41 issues a retrieval request to the retrieving means 13 of the database management apparatus 1, using this key word as a retrieval condition (FIG. 10(a)). The item selecting means 41 shows the user a list of items which are obtained as a result of retrieval (FIG. 10(a)), as shown in the screen of FIG. 9B, and urges the user to select. In this case, assuming that the user selects the first candidate, "/public/alpha/beta," the item selecting means 41 issues a referring request to the referring/updating means 12 of the database management apparatus 1, regarding the item which is selected by the user. As a result, whole information on the item (/public/alpha/beta) is obtained (FIG. 10(b)).

With respect to the item which is obtained by the item selecting means 41 (FIG. 10(c)), the manager apparatus deciding means 45 inquires the internal cache 46, first, and then the item-manager apparatus mapping means 312 of an arbitrary know-how management apparatus 3 (FIG. 10(d)), to judge which know-how management apparatus manages know-how regarding a corresponding software product. In this embodiment, it is assumed that the inquired know-how management apparatus 3 manages the know-how. The packaging means 47 inquires the article referring/posting means 32 of the identified know-how management apparatus 3, and obtains an article list related to the software product (FIG. 10(e)).

At the same, the question transmitting means 310 is inquired, so that a consultant list related to the item is obtained (FIG. 10(f)). The packaging means 47 generates a virtual package linking the software product, the article list and the consultant list (FIG. 10(g)), and virtual package browsing means 48 discloses the virtual package to users. The screen shown in FIG. 9C is an example of the virtual package. In FIG. 9C, denoted as "packages, documents, available services" is an item which is entered in the database management apparatus 1, and denoted as "common people information" is information in which the know-how management apparatuses 3 as well are entered. In the present embodiment, when a user clicks a mouse on an underlined portion, he can obtain detailed information such as lists of actual articles and consultants.

3) Posting of Question and Article

When a user asks a question to a consultant on an item through the virtual package browsing means 42 of the interface apparatus 4, the virtual package browsing means 42 transmits the question to the question transmitting means 310 of the know-how management apparatus 3. The question transmitting means 310 refers to the item-consultant list 39 and transmits the question to a group of entered consultants.

These consultants refer to the question and provide answers, using the questioning/answering means 43 of the interface apparatus 4. Receiving an answer from a consultant, the question transmitting means 310 transmits the answer to the virtual package browsing means 42 for the questioner. When received no answer from a consultant, the question transmitting means 310 requests the article referring/posting means 32 to enter an article of the question, so that the article referring/posting means 32 enters the article in the item-article list 31.

Through the virtual package browsing means 42 of the interface apparatus 4, the user can post an opinion on the item and know-how, as an article. When the virtual package browsing means 42 issues an entry request on the article to the article referring/posting means 32 of the know-how management apparatus 3, the article is entered in the item-article list 31. By means of a control article, a poster can be entered as a consultant on this item, only to users who are within a certain limited range of distribution of information.

FIG. 13 shows an example of an article which is posted by a user through the virtual package browsing means 42. In the present embodiment, an article having a "Control:" field in an article header is a control article, and control articles are stored in the item-article list 31 and interpreted by the article managing means 35. If the "Control:" field is "consulting," a provider of information is entered in the item-consultant list 39. In the example of a screen shown in FIG. 13, a provider of information is providing know-how related to the software product "/public/alpha/beta. " Since the "Control:" field is "consulting," a poster of this article is entered in the item-consultant list 39 as a consultant. Further, since "Consulting:" field is "local," the poster of this article is designated as a consultant who works only within a relatively small range of distribution of information.

4) Transfer of Management Right

When one of the know-how management apparatuses 3 issues a management right get request to another know-how management apparatus 3, the management information transmitting/receiving means 34 of the other know-how management apparatus 3 removes information regarding a requested item from the management information 37 in response to the issued management right get request, and transmits the information to the requesting know-how management apparatus 3. Conversely, when a management right transfer request is issued from another know-how management apparatus 3 and the management information 37 related to the corresponding item is transmitted therefrom, the right transferred know-how management apparatus 3 adds the received management information 37 to its management information 37. At this stage, the item-manager apparatus mapping means 312 of the know-how management apparatus 3 which requested a management right transfer such as acquisition or assignment of the management right or which is requested for transfer of a management right informs all the other know-how management apparatuses 3 on the network 5 of updating of the item-manager apparatus list 33 and the updating contents of the list 33.

Figure 11:
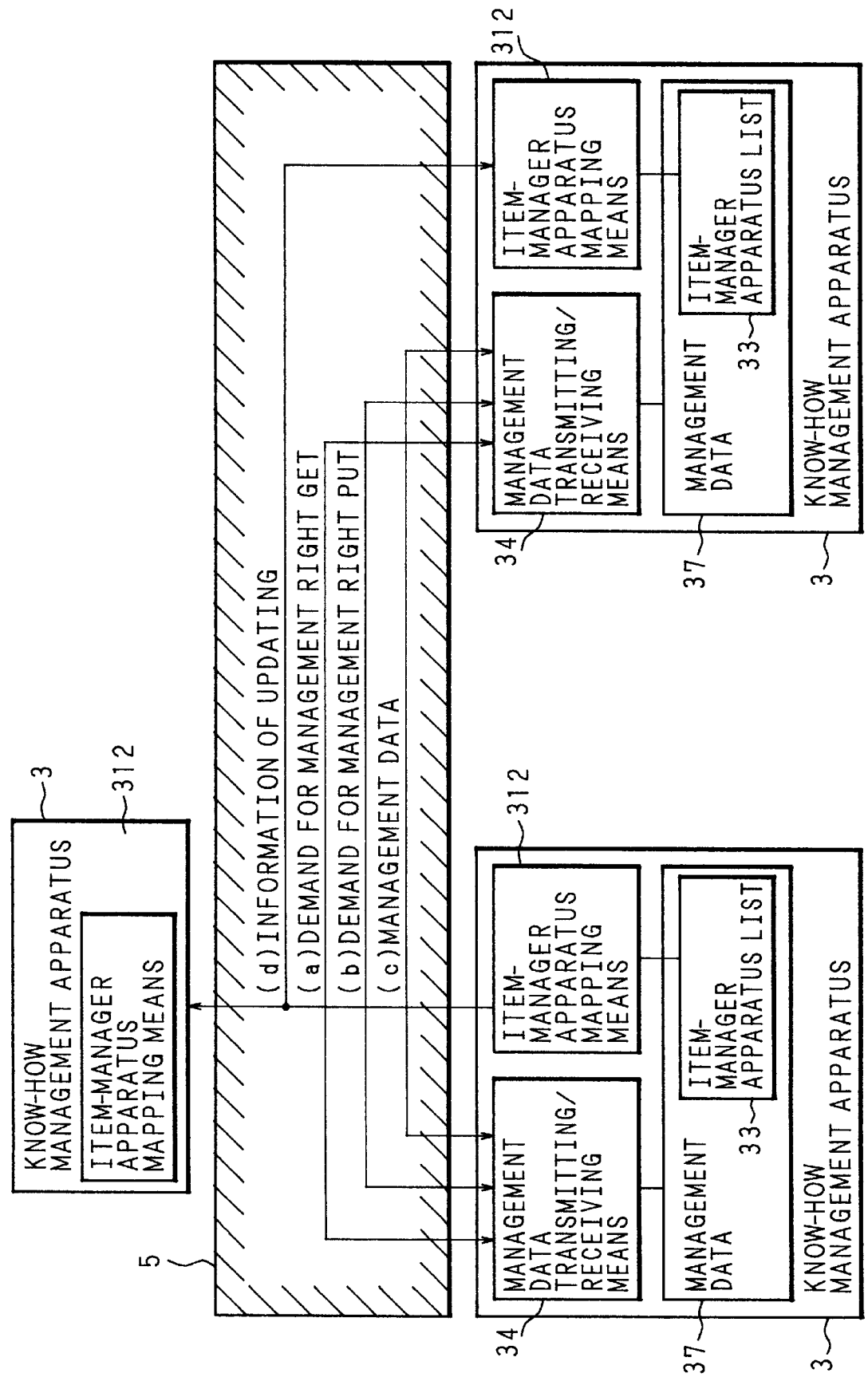
FIG. 11 is an explanatory view showing an operation of a system in which a plurality of the know-how management apparatuses according to the present invention are connected to each other.

FIG. 11 is a view showing an operation within the know-how management system 6 in which a plurality of know-how management apparatuses 3 of the present invention are connected to each other, in a case where another know-how management apparatus 3 is requested for acquisition or transfer of a management right of information. F1G. 11 omits an inner structure which is not necessary for describing the operation, for simplicity of illustration.

In accordance with a management right get request from another know-how management apparatus (FIG. 11(a)), the management information transmitting/receiving means 34 removes information regarding a requested item from the management information 37 and transmits the same to the requesting know-how management apparatus 3 (FIG. 11(c)). Further, the management information transmitting/receiving means 34 receives the management information 37 regarding the corresponding item (FIG. 11(c)) and adds the same to its management information 37, in response to a management right transfer request (FIG. 11(b)) from another know-how management apparatus 3. The item-manager apparatus mapping means 312 informs other know-how management apparatuses 3 of a notice of updating, when the item-manager apparatus list 33 is changed because of transmission of information accompanied with transfer or acquisition of the management right (FIG. 11(d)).

Hence, through the manager apparatus deciding means 45 of the interface apparatus 4, it is possible to inquire any know-how management apparatus 3 about the manager apparatus of an item whichever know-how management apparatus 3 manages the item.

In most cases, a management right get request is used when adding a new item which including existing items in a certain meaning. In this embodiment, a management right get request is realized by means of a control article. FIG. 14 shows an example of a control article realizing a management right get request. The "Control:" field is "management get," which means that the request is a management right get request. The "View:" field does not denote a management right get request regarding an existing item. Rather, the "View:" field expresses a request for creation and management of a new item which includes a field of "sentence structure checking function. "

Receiving the control article which demands to create such a new item, the know-how management apparatus 3 checks the existence of the know-how management apparatus 3 which is operated by a requesting person "someuser@flab. fujitsu. co. jp, " and transmits a format of the management information 37 regarding the item to this know-how management apparatus 3. At the same time, this control article is entered in the existing item-article list 31 regarding "/public/alpha/beta, /public/alpha/gamma, /public/alpha/beta2." As a result, the retrieving person who has retrieves these existing items is informed of the existence of the item which includes these software products with respect to the sentence structure checking function.

The manager of the new item "someuser@flab. fujitsu. co. jp" transmits a control article in which the "Control:" field is "management put" as a management right transfer request when management of the know-how cannot be performed, so that the management information 37 regarding the previously accumulated items to another know-how management apparatus 3.

5) Clipping

Instead of entering an item name through the interface apparatus 4, the clipping apparatus 2 may perform retrieval from the data base 11. A user issues a clipping condition updating request to the clipping condition updating means 22 of the clipping apparatus 2 through the item selecting means 41 of the interface apparatus 4, so as to enter a personal clipping condition. The personal clipping agent 23 of the clipping apparatus 2 issues a clipping request to the database management apparatus 1 and/or the know-how management apparatus 3 in accordance with the name of a clipping apparatus which is defined in the personal clipping condition. The personal clipping agent 23 transmits a result of clipping to the item selecting means 41, as a notice of clipping result.

Figure 12:
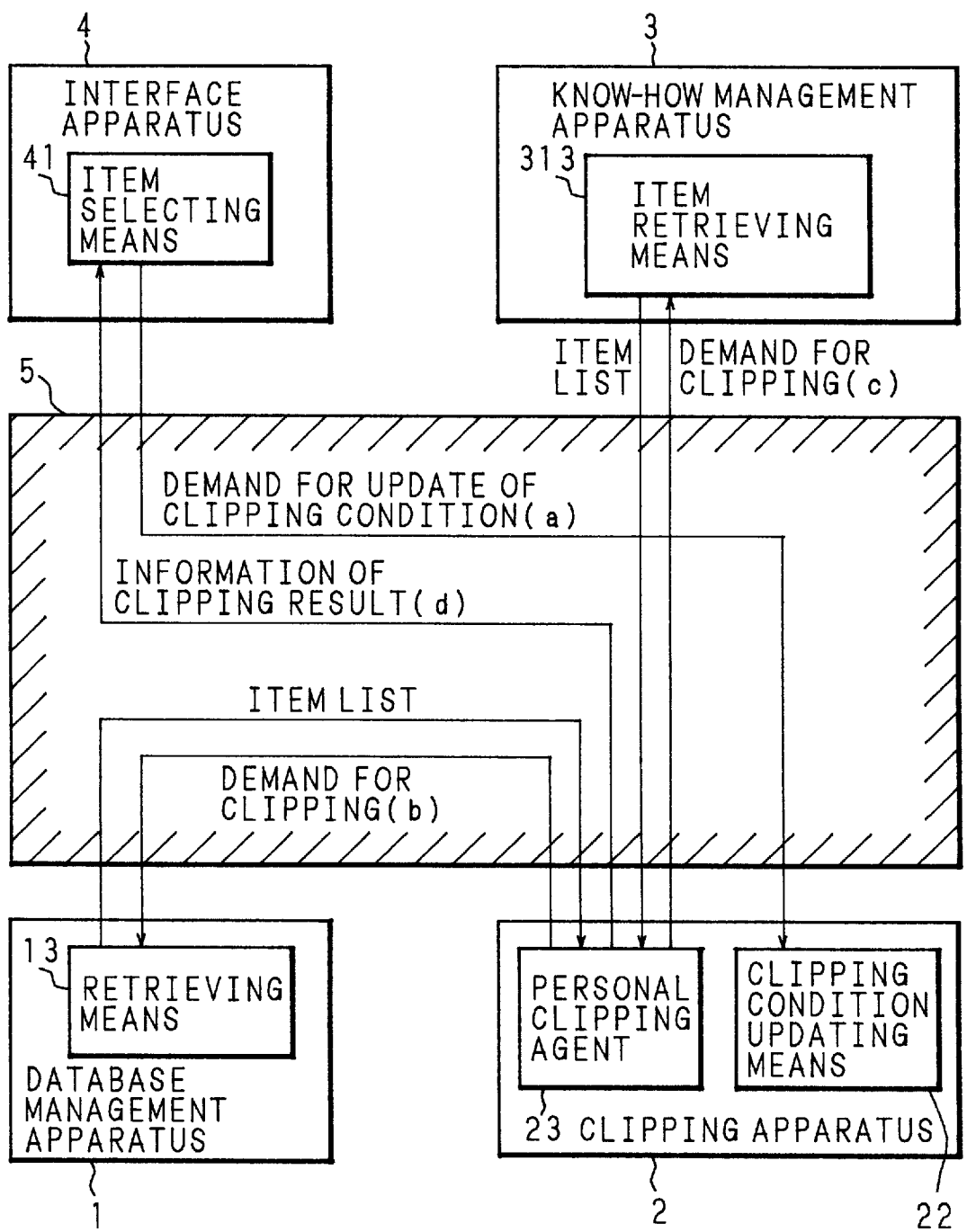
FIG. 12 is an explanatory view showing an operation of the clipping apparatus according to the present invention.

FIG. 12 is a view of describing clipping performed by the clipping apparatus. For simplicity of illustration, FIG. 12 omits an inner structure which is not necessary for describing the operation.

A user issues a clipping condition updating request to the clipping condition updating means 22 of the clipping apparatus 2 in advance so as to enter a personal clipping condition (FIG. 12(a)). In accordance, with the entered personal clipping condition, the personal clipping agent 23 of the clipping apparatus 2 issues a clipping request to the retrieving means 13 of the database management apparatus 1 if the name of a clipping apparatus which is defined in the personal clipping condition specifies the database management apparatus 1 (FIG. 12(b)), but issues the clipping request to the retrieving means 13 of the database management apparatus 1 and item retrieving means 313 of the know-how management apparatus 3 if the name of a clipping apparatus which is defined in the, personal clipping condition specifies the know-how management apparatus 3 (FIG. (12(c)). When clipping the know-how management apparatus 3, the personal clipping agent 23 links results of clipping (FIG. 12(b) (c)) and transmits the same to item selecting means 41, as a notice of clipping result (FIG. 12(d)).

If retrieval on the know-how management apparatus 3 is performed in this manner, it is possible to retrieve reputation information, using key words such as "a software product on which a consultant is available within the company " and "a package with the total number of articles exceeding 50."

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A know-how management system, comprising a plurality of know-how apparatuses, each apparatus including:

an article posting unit that posts an article regarding one of a plurality of items stored in a database;

a storage unit that stores a list indicating, for an indicated item in the plurality of items, a consultant who will answer questions regarding the indicated item;

a first means for transferring management rights regarding a selected item from among the plurality of items from said know-how apparatus to a second know-how apparatus, including a management right for articles regarding the select item and a management right for a consultant list regarding the selected item;

a second means for receiving management rights from another know-how apparatus; and a third means for storing an item-manager apparatus list, for updating the item-manager apparatus list upon transfer of management rights and upon receipt of management rights, and for creating a new item in the database by composing received management rights regarding at least two of the plurality of items;

wherein the item-manager apparatus list identifies, for each item, a corresponding know-how apparatus having management rights pertaining to the item.

2. A know-how management apparatus, comprising:

an article posting unit that posts an article by a poster regarding one of a plurality of items stored in a data base;

a storage unit that stores a list indicating, for each of the plurality of items, a consultant who can answer a question on the item;

an article management unit that enters a poster into the list as a consultant for a specified item, and that sets a consulting range for the consultant indicating a consulting range of users for which the consultant acts as a consultant; and a question transmission unit that accepts a question submitted by a user regarding an item, refers to a consulting range and selects a consultant having the user within the consultant's consulting range, and transmits the question to the selected consultant.

3. The know-how management apparatus of claim 1, wherein said question transmission unit transmits the accepted question to each of a plurality of consultants when:

the consultant is a consultant for the item of the accepted question; and a corresponding consulting range is set for the consultant and the corresponding consulting range includes the user who submitted the question.

4. A know-how management system, comprising:

a plurality of know-how apparatuses, each apparatus including:

an article posting unit that posts an article regarding one of a plurality of items stored in a database;

a storage unit that stores an item-consultant list indicating, for an indicated item of the plurality of items, a consultant who will answer questions regarding the indicated item;

a transmission unit that transmits management information to a second know-how apparatus, the management information including a posted article regarding a selected item from the plurality of items stored in the database and a consultant list for the selected item;

a reception unit that receives, from another know-how apparatus, management information regarding another item selected from the plurality of items in the database;

a second storage unit that stores an item-manager apparatus list identifying, for each item stored in the database, a corresponding know-how apparatus that manages management information regarding the item; and an article managing unit that creates a new item by performing consolidation of respective management information regarding at least two of the plurality of items and modifying the item-manager apparatus list to indicate that said know-how apparatus manages management information regarding the new item.

5. The know-how management system of claim 4, wherein each know-how apparatus further comprises a mapping unit that updates the item-manager apparatus list to indicate transmission and reception of management information, and wherein:

the transmission unit transmits management information upon receiving a management right get request; and the reception unit receives the management information in response to a management right get request transmitted by said know-how apparatus.

6. The know-how management system of claim 4, wherein for each of the know-how apparatuses consolidation of the respective management information includes:

modifying an item-article list to indicate an article list regarding the new item, the article list including an article regarding an item of the at least two items;

modifying the item-consulting list to indicate a consultant list regarding the new item, the consultant list including a consultant for an item of the at least two items; and modifying the item-manager apparatus list to indicate that said know-how apparatus manages management information regarding the new item.

7. A method of managing know-how, comprising the steps of:

posting an article by a poster regarding a specified item stored in a database;

entering the poster into a list as a consultant for the specified item;

setting a consulting range for the poster in the list when the article indicates the consulting range as a range of users for whom the poster is entered as a consultant;

accepting a question from a user regarding a selected item stored in the database;

referring to a consulting range set in the list for a selected consultant; and transmitting the question to the selected consultant when the consulting range for the selected consultant includes the user who submitted the question.

8. A computer-readable medium encoded with a program for managing know-how, the program comprising the functions of:

posting an article by a poster regarding a specified item stored in a database;

entering the poster into a list as a consultant for the specified item;

setting a consulting range for the poster in the list when the article indicates the consulting range as a range of users for whom the poster is entered as a consultant;

accepting a question from a user regarding a selected item stored in the database;

referring to a consulting range set in the list for a selected consultant; and transmitting the question to the selected consultant when the consulting range for the selected consultant includes the user who submitted the question.

* * * * *